United States Patent
Jeon

(10) Patent No.: US 9,084,085 B2
(45) Date of Patent: Jul. 14, 2015

(54) METHOD AND SYSTEM FOR CHANGING OPERATION MODE OF PORTABLE TERMINAL

(75) Inventor: Jong-Hyeok Jeon, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 245 days.

(21) Appl. No.: 13/539,581

(22) Filed: Jul. 2, 2012

(65) Prior Publication Data

US 2013/0012181 A1 Jan. 10, 2013

(30) Foreign Application Priority Data

Jul. 4, 2011 (KR) .................. 10-2011-0066030

(51) Int. Cl.
*H04M 3/00* (2006.01)
*H04W 4/02* (2009.01)
*H04M 1/725* (2006.01)
*H04W 48/04* (2009.01)
*H04W 88/02* (2009.01)

(52) U.S. Cl.
CPC .......... *H04W 4/027* (2013.01); *H04M 1/72577* (2013.01); *H04W 48/04* (2013.01); *H04M 1/72572* (2013.01); *H04M 2250/10* (2013.01); *H04W 88/02* (2013.01)

(58) Field of Classification Search
None
See application file for complete search history.

(56) References Cited

U.S. PATENT DOCUMENTS

2006/0178108 A1* 8/2006 Chotoku et al. ............ 455/26.1
2008/0300736 A1* 12/2008 Tarleton et al. ................ 701/3
2009/0253455 A1* 10/2009 Huang ....................... 455/550.1

FOREIGN PATENT DOCUMENTS

KR 10-2002-0087541 A 11/2002

* cited by examiner

*Primary Examiner* — Keith Fang
(74) *Attorney, Agent, or Firm* — Cha & Reiter, LLC

(57) ABSTRACT

An apparatus and method for changing an operation mode of a portable terminal includes checking a moving distance of the portable terminal during a predetermined time period using received location information, checking a moving speed of the portable terminal from the checked moving distance and the predetermined time period, and changing the operation mode of the portable terminal to an airplane mode if the checked moving speed is higher than a preset speed.

14 Claims, 3 Drawing Sheets

METHOD AND SYSTEM FOR CHANGING OPERATION MODE OF PORTABLE TERMINAL

CLAIM OF PRIORITY

This application claims the benefit under 35 U.S.C. §119 of a Korean Patent Application filed in the Korean Intellectual Property Office on Jul. 4, 2011 and assigned Serial No. 10-2011-0066030, the entire disclosure of which is hereby incorporated by reference.

BACKGROUND OF THE INVENTION

1. Field of the Invention

The present invention relates to using location information by a portable terminal, and more particularly to changing an operation mode of a portable terminal.

2. Description of the Related Art

Portable terminals such as a smart phone, a tablet PC, etc. provide several useful functions to users and have become widely used recently.

With the popular use of the portable terminals, the users of the portable terminals use the portable terminals even during their trip in the air.

However, the use of the portable terminal on an airplane disturbs operations of electronic devices of the airplane, such that airlines ask passengers to refrain from using the portable terminals on the airplane, especially during a takeoff or landing.

To prevent an airline service from being disturbed by the use of the portable terminal, the portable terminal provides an airplane mode. Once the operation mode of the portable terminal is changed to the airplane mode, the portable terminal blocks its communication function to enable the user to use the portable terminal on the airplane without negatively affecting the airline service. However, the user has to inconveniently and manually set on or off of the airplane mode.

Therefore, it is a need for improved scheme to automatically enter or exit the airplane mode of the portable terminal.

SUMMARY OF THE INVENTION

Accordingly, an aspect of the present invention is to provide a scheme which allows a user to automatically enter or exit an airplane mode of a portable terminal without negatively affecting an airline service and separately setting on or off of the airplane mode.

According to an aspect of the present invention, a method for changing an operation mode of a portable terminal includes checking a moving distance of the portable terminal during a predetermined time period using received location information, checking a moving speed of the portable terminal within the predetermined time period, and changing the operation mode of the portable terminal to an airplane mode if the checked moving speed is higher than a preset speed.

According to another aspect of the present invention, an apparatus for changing an operation mode of a portable terminal includes a positioning module for receiving location information of the portable terminal and a controller for checking a moving distance of the portable terminal during a predetermined time period using the received location information, checking a moving speed of the portable terminal within the predetermined time period, and changing the operation mode of the portable terminal to an airplane mode if the checked moving speed is higher than a preset speed.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION

A portable terminal according to an embodiment of the present invention is a mobile electronic apparatus which is easy to carry, examples of which may include a video phone, a general portable phone (e.g., a feature phone), a smart phone, an International Mobile Telecommunication (IMT)-2000 terminal, a Wideband Code Division Multiple Access (WCDMA) terminal, a Universal Mobile Telecommunication Service (UMTS) terminal, a Personal Digital Assistant (PDA), a Portable Multimedia Player (PMP), a DMB device, an electronic book, a portable computer (e.g., a notebook, a tablet Personal Computer (PC)), a digital camera, and so forth.

A portable terminal according to an embodiment of the present invention will be described with reference to FIG. 1 which is a block diagram of the portable terminal according to an embodiment of the present invention.

Figure 1:
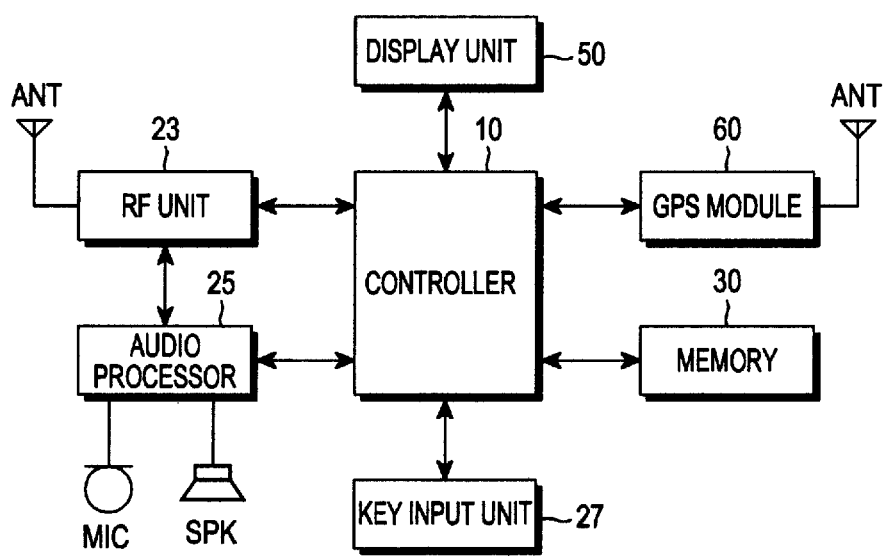
FIG. 1 is a block diagram of a portable terminal according to an embodiment of the present invention.

Referring to FIG. 1, a Radio Frequency (RF) unit 23 performs a wireless communication function of the wireless terminal. The RF unit 23 includes an RF transmitter for up-converting a frequency of a transmission signal and amplifying the transmitted signal and an RF receiver for low-noise amplifying a received signal and down-converting the frequency of the received signal. A modem includes a transmitter for encoding and modulating the transmission signal and a receiver for demodulating and decoding the received signal.

An audio processor 25 may constitute a codec including a data codec and an audio codec. The data codec processes packet data and the audio codec processes audio signals like voice and a multimedia file. The audio processor 25 also converts a digital audio signal received from the modem into an analog audio signal through the audio codec and reproduces the analog audio signal, or converts an analog audio signal generated from a microphone (MIC) into a digital audio signal through the audio codec and transmits the digital audio signal to the modem. The codec may be separately provided or may be included in the controller 10.

When the portable terminal enters an airplane mode, the audio processor 25 according to an embodiment of the present invention may output entry to the airplane mode to a user in the form of auditory information (for example, sound information saying that the portable terminal has entered the airplane mode). Once the airplane mode is released, the audio processor 25 according to an embodiment of the present invention may output exit from the airplane mode to the user in the form of auditory information (for example, sound information saying that the portable terminal has exited the airplane mode).

A key input unit 27 may include keys for inputting numeric and character information and function keys or a touch pad for setting various functions. When a display unit 50 is implemented with a touch screen of a capacitive type, a resistive type, etc., the key input unit 27 may include only preset minimum keys, such that the display unit 50 may replace a part of the key input function of the key input unit 27.

The key input unit 27 according to an embodiment of the present invention provides a function of allowing the user to manually enter or exit the airplane mode.

A memory 30 may include program and data memories. The program memory stores programs for controlling a general operation of the portable terminal The memory 30 may include an external memory such as a Compact Flash (CF), a Secure Digital (SD), a Micro Secure Digital (Micro-SD), a Mini-SD, an Extreme Digital (xD), a memory stick, or the like. The memory 30 may also include a disk such as a Hard Disk Drive (HDD), a Solid State Disk (SSD), etc.

Under control of the controller 10, the memory 30 according to an embodiment of the present invention stores location information of the portable terminal (which may be understood as location information of an airplane which the user boards) in a separate database at predetermined time intervals using Ground Positioning System (GPS) information received from a GPS module 60, and may provide the location information of the portable terminal stored in the database to another component (e.g., the controller 10) if necessary.

The GPS module 60 receives GPS information including information such as ephemeris, almanac, etc., together with a coefficient for error correction, to provide location information regarding a current location of the portable terminal based on a longitude value, a position value, and so forth corresponding to the current location of the portable terminal. For the portable terminal, an Assismous GPS (A-GPS) system which combines an assisted GPS system and an autonomous GPS system is generally used due to its short Time To First Fix (TTFF), which is a time required for receiving a GPS signal and calculating the current location.

Meanwhile, a positioning system, such as a GPS, may be classified into several types according to its operating method, e.g., a Global Navigation Satellite System (GNSS or GLONASS) and so forth. Thus, the GPS information mentioned in an embodiment of the present invention may be understood as information which is acquired by at least one of a GPS, a GNSS, a GLONASS, etc., to identify a location of the portable terminal.

The GPS module 60 may be replaced with or used together with a separate hardware or software module capable of providing location information of the portable terminal. For example, a function of the GPS module 60 which provides location information of the portable terminal may be replaced with or used together with a positioning function using triangulation based on interworking between the RF unit 23 and base stations according to an embodiment of the present invention.

Therefore, a near-field wireless communication module (not shown) including the RF unit 23 and the GPS module 60 according to an embodiment of the present invention may be referred to as a positioning module, and may be used alone or in combination with another component.

The display unit 50 may include a Liquid Crystal Display (LCD), or Passive Matrix Organic Light Emitting Diode (PMOLED) or Active Matrix OLED (AMOLED) as an OLED, and outputs display information generated in the portable terminal. The display unit 50 may include a touch screen of a capacitive type, a resistive type, or the like to operate as an input unit for controlling the portable terminal, together with the key input unit 27.

The controller 10 controls the overall operation of the portable terminal 100 according to an embodiment of the present invention, and may switch and control the operation of the portable terminal according to a user input generated through the key input unit 27 or the display unit 50. Meanwhile, the controller 10 according to an embodiment of the present invention calculates a moving distance corresponding to a per-time location of the portable terminal (or the airplane which the user boards) from the GPS signal received through the GPS module 60, thus measuring a moving speed of the portable terminal. If the controller 10 determines that the measured moving speed of the portable terminal is higher than a preset speed, the controller 10 changes the operation mode of the portable terminal to the airplane mode. If the controller 10 according to an embodiment of the present invention determines that the measured moving speed is lower than the predetermined speed, the controller 10 exits the airplane mode.

Although devices which can be included in the portable terminal, such as a Ground Positioning System (GPS) module, a camera module, a Bluetooth module, a WiFi module, an acceleration sensor, a proximity sensor, a geo-magnetic sensor, a Digital Media Broadcasting (DMB) receiver, etc. are not shown in FIG. 1, it will be obvious to those of ordinary skill in the art that those devices may also be included in the portable terminal to provide corresponding functions.

For example, by using an acceleration sensor and a gyroscope separately or in combination, a dynamic force applied to the portable terminal, such as acceleration, a vibration, a shock, etc., and the mechanical movement of the portable terminal are measured, thereby acquiring and using slope information and movement information of the airplane which the portable terminal's user boards.

A camera module which allows the user to capture a (still or moving) image may also be included in the portable terminal, such that location information acquired by the GPS module 60 at the time of capturing may be inserted into a captured image to allow the user to know later the location where the image is captured.

When a near-field wireless communication module, such as a Bluetooth module, a Near-Field Communication (NFC) module, a WiFi module, or the like, is included in the portable terminal, the controller 10 according to an embodiment of the present invention may implement the embodiment of the present invention by receiving the location information of the portable terminal with the use of the near-field wireless communication module.

Figure 2:
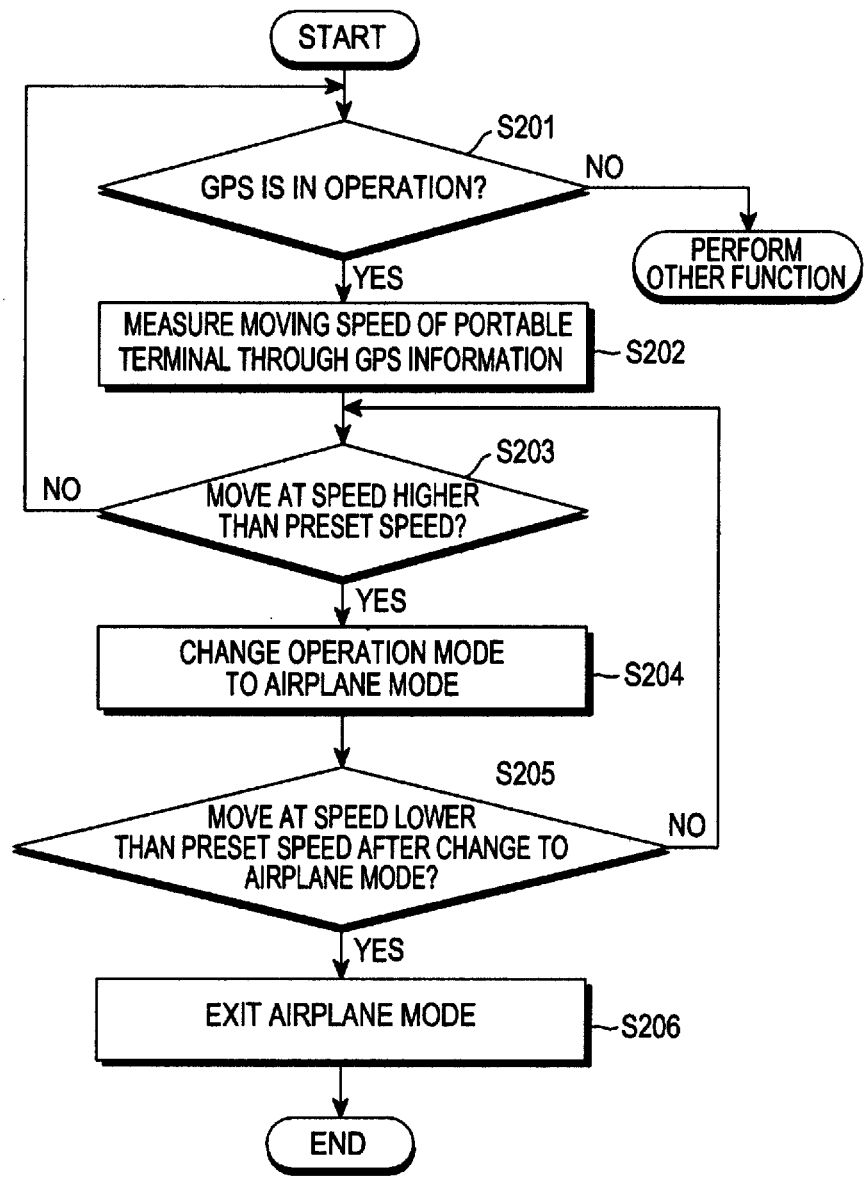
FIG. 2 is a flowchart illustrating a process of changing an operation mode of a portable terminal according to an embodiment of the present invention.
Figure 3:
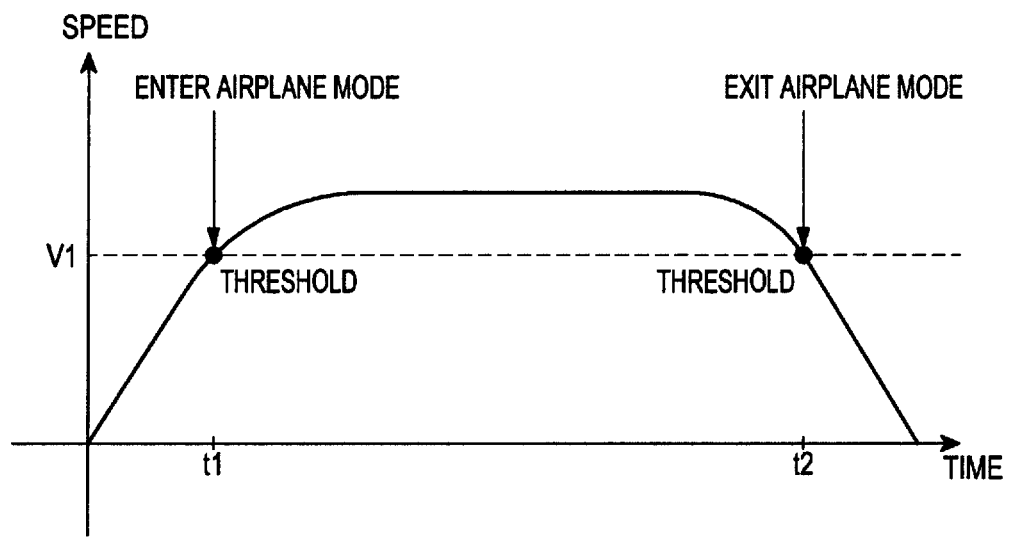
FIG. 3 is an exemplary diagram for helping understanding of a process of changing an operation mode of a portable terminal according to an embodiment of the present invention.

FIG. 2 is a flowchart illustrating a process of changing the operation mode of the portable terminal according to an embodiment of the present invention, and FIG. 3 is an exemplary diagram for helping understanding of the process of changing the operation mode of the portable terminal according to an embodiment of the present invention. With reference to FIGS. 1 through 3, the embodiment of the present invention will now be described.

In steps S201 and S202, the controller 10 receives GPS information through the GPS module 60 in operation to measure the current moving speed of the portable terminal from the GPS information.

Once an airplane which a user carrying the portable terminal boards enters a taking-off stage, the speed of the airplane gradually increases. The controller 10 receives a GPS signal (e.g., location information) received through the GPS module 60 to continuously check the location of the portable terminal.

The controller 10 checks a location of the portable terminal corresponding to time (or a per-time location of the portable terminal), thus measuring a moving speed of the portable terminal during a predetermined time period. Thus, once the airplane gradually increases its speed for take-off, the controller 10 according to an embodiment of the present invention determines whether the moving speed of the airplane (which may be the moving speed of the portable terminal) reaches a preset threshold. Note that determining a speed of an object or airplane within a predefined time period using the location information and time is well known in the art.

Referring to FIG. 3, the preset threshold corresponds to an airplane's moving speed V1. Generally, lift necessary for the flight of the airplane can be acquired when the airplane moves at a speed of 250 km/h, and the speed for the airplane's take-off may be changed according to the number of passengers or the weight of freight on the airplane.

Therefore, the preset threshold (that is, the preset speed V1) in the embodiment of the present invention may be preferably set to an airplane's moving speed of 200 km/h through 250 km/h.

However, since transmission (Tx) signaling of the portable terminal during the taking-off stage of the airplane is a main cause for malfunction of the airplane, for the smooth taking-off of the airplane, the preset threshold (or the preset speed or threshold speed) V1 may be properly selected in a range of 150 km/h through 200 km/h.

In the embodiment of the present invention, the threshold speed V1 for changing the operation mode of the portable terminal to the airplane mode may be set, but not limited to, in a range of 150 km/h through 200 km/h or in a range of 200 km/h through 250 km/h.

Further, when the user inputs information regarding a type of the airplane (e.g., a flight ID that the user uses, a model name of the airplane, etc.) or the number of passengers in a setting menu related to the airplane mode, V1 may be changed reflecting to the input information. The information regarding the type of the airplane or the number of passengers may be provided from an external server such as a server of an airline (or a travel agency).

In steps S203 and S204, if determining that the measured moving speed of the portable terminal is higher than the preset speed, the controller 10 changes the operation mode of the portable terminal to the airplane mode.

If determining that the moving speed of the airplane (e.g., the moving speed of the portable terminal) reaches the preset speed V1 shown in FIG. 3, the controller 10 determines that the portable terminal is located in the airplane and about to take off soon.

If so, the controller 10 according to an embodiment of the present invention changes the operation mode of the portable terminal to the airplane mode. Once the operation mode of the portable terminal is changed to the airplane mode, the communication function of the portable terminal, which may disturb the airplane's take-off, is restricted by the controller 10.

In steps S205 and S206, if determining that the portable terminal moves at a moving speed lower than the preset speed after changing to the airplane mode, the controller 10 exits the airplane mode.

Referring to FIG. 3, after a point in time t1 at which the airplane's moving speed reaches V1, the airplane takes off and makes a successful flight. At a point in time t2 after the airplane continues flying from t1 to t2 (e.g., before or after t2), the airplane reduces its speed to land.

Generally, in the airplane mode, transmission and reception of every signal in the portable terminal are not stopped. For example, functions related to Tx signaling of a near-field wireless communication module (e.g., a Bluetooth module, an NFC module, or a wireless Local Area Network (LAN)) and the RF unit 23 are mainly blocked, and a component, such as the GPS module 60, which only performs reception (Rx) signaling, may not stop operating.

Therefore, even when the portable terminal enters the airplane mode according to an embodiment of the present invention, the GPS module 60 according to an embodiment of the present invention continues receiving the GPS signal, which less instructive. Thus, the controller 10 according to an embodiment of the present invention may continuously measures the moving speed of the portable terminal through the GPS signal received in the airplane mode.

That is, the GPS module 60 according to an embodiment of the present invention may receive GPS information even when the portable terminal enters the airplane mode and operates in the airplane mode, and the controller 10 according to an embodiment of the present invention may determine that the airplane is going to land soon if the moving speed V1 of the airplane reaches V1 before or after t2 shown in FIG. 3.

If determining that the airplane is going to land soon, the controller 10 changes the operation mode of the portable terminal from the airplane mode to a general mode (e.g., an idle mode or a normal mode) to wait for user's input. Preferably, after an elapse of a predetermined time period (e.g., a time until completion of landing of the airplane after 10 seconds or more) from t2, the controller 10 may change the operation mode of the portable terminal from the airplane mode to the general mode, and such setting may be changed by a user or a manufacturer for a more preferable embodiment.

When the portable terminal moves at a speed lower than the preset speed (e.g., V1), it may not be desirable to unconditionally exit the airplane mode and enter the general mode. For example, in a general use environment of the portable terminal (e.g., in case of movement on foot or by car), the moving speed of the portable terminal may be much lower than the taking-off or landing speed of the airplane.

Therefore, the controller 10 according to an embodiment of the present invention exits the airplane mode only when the portable terminal moves at a speed higher than the preset speed and enters the airplane mode, then terminal moves at a speed lower than the preset speed. Thus, it is possible to prevent the power of the portable terminal from being wasted by unnecessarily checking the operation mode of the portable terminal or releasing the airplane mode when the portable terminal does not operate in the airplane mode.

That is, in steps S205 and S206, the controller 10 according to an embodiment of the present invention exits the airplane mode and enters the general mode, after changing the operation mode of the portable terminal to the airplane mode due to taking-off of the airplane as in steps S201 through S204.

While it has been described in FIG. 3 that the taking-off speed and the landing speed of the airplane are equally higher than or lower than V1, they are not necessarily so. In other words, since the taking-off speed and the landing speed of the airplane may be different from each other, the moving speed of the airplane before or after entry to the airplane mode is V1 and the moving speed thereof before or after exit from the airplane mode may be a value (e.g., V2 (not shown)) which is different from V1.

As can be seen from the foregoing description, when the user is on the airplane, the portable terminal automatically enters or exits the airplane mode without user's separate manipulation, thereby improving user convenience and preventing malfunction of the airplane.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the present invention has been described in detail, an embodiment mentioned in the course of description is merely illustrative rather than restrictive and changes in components that can be substituted equivalently in the present invention also fall within the scope of the present invention, without departing from the technical spirit and scope of the invention as provided in the accompanying claims.

What is claimed is:

1. A method for changing an operation mode of a portable terminal, the method comprising:
    determining a moving distance of the portable terminal during a predetermined time period using received location information;
    determining a moving speed of the portable terminal within the predetermined time period;
    changing the operation mode of the portable terminal to an airplane mode if the moving speed is higher than a preset speed; and
    adjusting one of a plurality of preset speeds in accordance with a plurality of airplane types in which the portable terminal is located.

2. The method of claim 1, wherein the location information is acquired using Global Positioning System (GPS) information.

3. The method of claim 1, wherein the preset speed comprises a taking-off speed of the airplane.

4. The method of claim 1, further comprising changing the operation mode of the portable terminal from the airplane mode to a general mode if the moving speed is lower than the preset speed.

5. The method of claim 4, wherein the changing to the general mode comprises:
    determining whether the operation mode of the portable terminal is changed to the airplane mode when the moving speed of the portable terminal is higher than the preset speed; and
    determining whether the moving speed of the portable terminal is lower than the preset speed after changing the operation mode of the portable terminal to the airplane mode, and if the moving speed of the portable terminal is lower than the preset speed, changing the operation mode of the portable terminal from the airplane mode to the general mode.

6. The method of claim 4, wherein the preset speed comprises a landing speed of the airplane.

7. The method of claim 1, further comprising changing the operation mode of the portable terminal from the airplane mode to a general mode only when the portable terminal previously traveled at a speed higher than the preset speed during the airplane mode and, then now traveling at a speed lower than the preset speed.

8. An apparatus for changing an operation mode of a portable terminal, comprising:
    a positioning module for receiving location information of the portable terminal; and
    a controller to:
    determine a moving distance of the portable terminal during a predetermined time period using the received location information;
    determine a moving speed of the portable terminal within the predetermined time period;
    change the operation mode of the portable terminal to an airplane mode if the moving speed is higher than a preset speed; and
    adjust one of a plurality of preset speeds in accordance with a plurality of airplane types in which the portable terminal is located.

9. The apparatus of claim 8, wherein the location information is Global Positioning System (GPS) information, and the positioning module comprises a GPS module.

10. The apparatus of claim 8, wherein the preset speed comprises a taking-off speed of the airplane.

11. The apparatus of claim 8, wherein the controller changes the operation mode of the portable terminal from the airplane mode to a general mode if the moving speed is lower than the preset speed.

12. The apparatus of claim 11, wherein the controller,
    determines whether the operation mode of the portable terminal is changed to the airplane mode if the moving speed of the portable terminal is higher than the preset speed; and
    determines whether the moving speed of the portable terminal is lower than the preset speed after changing the operation mode of the portable terminal to the airplane mode, and changes the operation mode of the portable terminal from the airplane mode to the general mode if the moving speed of the portable terminal is lower than the preset speed.

13. The apparatus of claim 11, wherein the preset speed comprises a landing speed of the airplane.

14. The apparatus of claim 8, wherein the controller further changes the operation mode of the portable terminal from the airplane mode to a general mode only when the portable terminal previously traveled at a speed higher than the preset speed during the airplane mode and, then now traveling at a speed lower than the preset speed.

* * * * *